United States Patent [19]

Hiraiwa

[11] 3,918,986

[45] Nov. 11, 1975

[54] COMPOSITE MALTITOL POWDER

[75] Inventor: Takashi Hiraiwa, Yokohama, Japan

[73] Assignee: Nikken Chemicals Co., Ltd., Tokyo, Japan

[22] Filed: June 21, 1974

[21] Appl. No.: 481,765

[30] Foreign Application Priority Data

Aug. 14, 1973  Japan .................. 48-090567
June 21, 1973  Japan .................. 48-69234

[52] U.S. Cl. ............... 127/29; 127/30; 127/63; 426/213; 426/217
[51] Int. Cl.² ............ A23L 1/22; A23L 1/236; C13K 13/00
[58] Field of Search ......... 127/29, 30, 63; 426/213, 426/217

[56] References Cited
UNITED STATES PATENTS

| | | | |
|---|---|---|---|
| 3,651,221 | 3/1972 | Conrad | 426/217 |
| 3,656,973 | 4/1972 | Paterson | 426/217 |

OTHER PUBLICATIONS

Chemical Abstracts, 76: 2714d (1972).

Chemical Abstracts, 77: 99893t (1972).

Chemical Abstracts, 80: 69410c (1974).

*Primary Examiner*—Morris O. Wolk
*Assistant Examiner*—Sidney Marantz
*Attorney, Agent, or Firm*—Oblon, Fisher, Spivak, McClelland & Maier

[57] ABSTRACT

A composite maltitol powder is prepared from core particles containing more than 50% maltitol coated with fine saccharide particles having a diameter less than ½ the diameter of the core particles.

11 Claims, No Drawings

COMPOSITE MALTITOL POWDER

BACKGROUND OF THE INVENTION

1. Field of the Invention

The present invention relates to a low caking composite maltitol powder composed of core particles of maltitol coated with fine saccharide particles, and the manufacture thereof.

2. Description of the Prior Art

Maltitol is a sugar alcohol having a sweet taste similar to that of sucrose and is usually prepared by hydrogenation of maltose. Recently, it has been found that maltitol is not absorbed from the digestive organs and hence is important as a low-calorie sweetening material. Accordingly, liquid maltitol has been recently commerialized. However, the liquid product is inconvenient to transport and use, and a powdered product has thus been in high demand. Various unsuccessful efforts have been undertaken to produce a usable powdered maltitol, but the material has not been crystallized and the anhydrous product is vitriform and highly hygroscopic. A need exists therefore for powdered maltitol which can overcome the above disadvantages.

SUMMARY OF THE INVENTION

Accordingly, one object of the present invention is to provide a low caking composite maltitol powder.

Another object of the invention is to provide a process for imparting low caking properties to maltitol powder.

These and other objects of the invention as will hereinafter become more readily understood can be attained by a powder of core particles containing maltitol as the main component with a coating of fine saccharide particles.

DETAILED DESCRIPTION OF THE PREFERRED EMBODIMENTS

In the low caking composite maltitol powder of the invention, the core particles may be pure maltitol, but usually contain more than 50 wt. %, preferably 70 wt. %, of maltitol and other ingredients such as sorbitol, hydrogenated oligosaccharides or hydrogenated dextrin. The latter is economical. When the content of maltitol in the core particles is less than 50%, the low calorie characteristic of the product will be disadvantageously lost.

Core particles having a diameter of 100 – 4000 $\mu$, may be used. However, core particles having a diameter of 400 – 1700 $\mu$ are preferable because of ease of preparation and use of the particles. Other sweetening agents, e.g. saccharin, sodium cyclamate, glycyrrhizin may be added to the core particles.

Suitable fine saccharide particles include monosaccharides, such as glucose, fructose, xylose; disaccharides, such as sucrose, maltose, lactose, isomaltose; powder wheat gluten, dextrin, starch and cellulose. More than two types of fine saccharide particles may be combined. Other sweetening agents, e.g. saccharin, sodium cyclamate, glycyrrhizin may be admixed with the fine saccharide particles. The fine saccharide particles should have a smaller diameter than those of the core particles, and should be less than ½, preferably less than 1/5, that of the core particles, and is in the range of 20 – 350 $\mu$, preferably 40 – 170 $\mu$. When the ratio of fine saccharide particles to core particles is too high, the low calorie characteristics of the product will be lost. On the other hand, when the ratio is too low, insufficient inhibition of caking will result. Accordingly, a suitable ratio of fine saccharide particles is usually 10 – 100 wt. parts, preferably 15 – 55 wt. parts, to 100 wt. parts of core particles.

The low caking composite maltitol powder of the invention is composed of 100 wt. parts of core particles containing more than 50%, preferably more than 70%, maltitol and having a diamter of 100 – 4000 $\mu$, preferably 400 – 1700 $\mu$, and 10 – 100 wt. parts of saccharide fine particles having a diameter of 20 – 350 $\mu$, preferably 40 – 170 $\mu$, coated on the surface of the core particles. The saccharide fine particles are contacted with the molten surface of the core particles which are then solidified by cooling whereby the saccharide fine particles become bonded to the core particles.

The low caking composite maltitol powder of the present invention may be prepared as follows: A maltitol solution containing more than 50%, preferably more than 70%, total solid component is heated and condensed to produce a molten product containing less than 2% water. The molten product is cooled to form a block which is crushed in a drier and sifted to produce core particles having a diameter of 100 – 4000 $\mu$, preferably 400 – 1700 $\mu$. Saccharide particles, such as fructose, sucrose, or the like are crushed, sifted and dried to produce particles having a diameter of 20 – 350 $\mu$, preferably 40 – 170 $\mu$. A suitable amount of the maltitol core particles and the fine saccharide particles are placed in a mixer, and are gradually heated with stirring. The ratio of the fine saccharide particles is in the range of 15 – 200 wt. parts, preferable 50 – 120 wt. parts, to 100 wt. parts of the maltitol core particles.

In general, the addition of an excess of the fine saccharide fine particles is preferable. When the temperature of the particles rises too rapidly, the fine saccharide particles are not uniformly coated onto the surface of the core particles. Accordingly, heating is preferably conducted so as to gradually raise the temperature of the particles with sufficient stirring from a fixed or rotary mixer. The temperature must be controlled to a range higher than the softening or semi-melting temperature of the maltitol core particles and lower than the softening temperature of the fine saccharide particles. Maltitol core particles containing less than 2% water begin to soften above 38°C, and are semi-melted at 60° – 80°C. Maltitol core particles containing 0.01% water begin to soften above 70°C. On the other hand, the softening temperature or semi-melting temperature of the fine saccharide particles is usually above 80°C. Accordingly, the temperature during mixing is preferably kept at 50° – 100°C., most preferably 60° – 80°C. When the mixture of particles is heated to the predetermined temperature of 40° – 100°C, preferably 60° – 80°C, the mixture is stirred at that temperature until the fine saccharide particles are uniformly coated onto the surface of the core particles. The time required for the coating is dependent upon the amount of material and upon the temperature of the mixture, and is usually in the range of 10–120 minutes. The stirring velocity is selected so as to give uniform contact of the fine saccharide particles with the maltitol core particles. During the stirring operation enough fine saccharide particles are coated onto the surface of the maltitol core particles so as to decrease the tackiness and to improve the fluidity. At this point heating is stopped, and the mixture is cooled and sifted to separate excess fine saccharide particles and produce the composite maltitol powder. The separated fine saccharide particles may be recycled.

The composite maltitol powder may also be prepared as follows: The maltitol core particles are mixed with the fine saccharide particles to coat the fine saccharide particles onto the surface of the core particles, and the mixture is cooled and sifted to separate excess fine saccharide particles. The composite powder is wetted by intermittently sparying water thereon, feeding steam thereto, drying and mixing for a desirable time. The wet-dry operation may be repeated. It may be preferable to conduct the wet-dry operation on the mixture without separating the fine saccharide particles. Partial dissolution or crystallization of the coated saccharide particles results from the wet-dry operation, whereby the spaces between the fine saccharide particles which are coated onto the surface of the core particles are filled and thus accomplish the coating.

Suitable mixers used in the process of the invention include any mixer which is adaptable for mixing or blending powder or granules. A mixer whose inner temperature can be controlled is preferable. Suitable mixers include fluid bed mixers, horizontal rotary cylindrical mixers, ribbon mixers, and conical jacket mixers.

The low caking composite maltitol powder produced will not cake in the air and the fluidity of the composite powder can be maintained for more than 2 hours, depending upon the ambient temperature and humidity.

Having generally described the invention, a more complete understanding can be obtained by reference to certain specific examples, which are included for purposes of illustration only and are not intended to be limiting unless otherwise specified.

Example 1

A 1 kg portion of an aqueous solution containing 75% solid components composed mainly of maltitol (75% maltitol, 5% sorbitol and 20% of a sugar alcohol higher than a trisaccharide alcohol) was condensed in a vacuum to 99.5% solid content in the form of a vitriform block. The block was crushed and sifted in an atmosphere with 40% relative humidity and a temperature of 32°C to produce maltitol particles having an average diameter of 700 $\mu$. A 100 g amount of the resulting particles was mixed with 120 g of fine fructose particles having a water content of 0.5% and an average diameter of 350 $\mu$, in a small fluidizing drier. Air was passed at 65°C for 10 minutes. The hot air in the drier was changed to cool air with 40% relative humidity and a temperature of 25°C to cool the product. Excess fine fructose particles were sifted to obtain 154 g of a low caking composite powder. The composite powder had an angle of repose of 41° and bulk density of 0.66 g/cm³. The coated fructose content was 35% (54 parts of fructose to 100 parts of core particles). Even though the composite powder was kept for 2 hours in an atmosphere with relative humidity of 67.5%, at 23.5°C, the fluidity of the composite powder did not decrease.

Example 2

A 100 g portion of the maltitol particles having an average diameter of 700 $\mu$, prepared by the process of Example 1, was mixed with 15 g of fine fructose particles having a water content of 0.5% and an average diameter of 40 $\mu$ in a small ribbon mixer which was indirectly heated with hot water. The temperature of the mixer was gradually increased. The maximum temperature of the hot water was 98°C. The treatment was continued for about 15 minutes. When the fluidity of the composite powder was improved, the hot water was changed to cool water (25°C) to cool the composite powder to less than 35°C. Excess fine fructose powder was sifted away to obtain 110 g of a low caking composite powder. The composite powder had an angle of repose of 41° and bulk density of 0.81 g/cm³. The coated fructose content was 13% (15 parts of fructose to 100 parts of core particles). Even though the composite powder was kept for 2 hours in an atmosphere with a relative humidity of 67.5% at 23.5°C, the fluidity of the composite powder was not decreased.

Example 3

A 100 kg portion of the aqueous solution containing mainly maltitol of Example 1 was concentrated in a vacuum condenser under a pressure of 740–750 mmHg at a maximum temperature of 120°C. The molten product had sufficient fluidity at high temperature to flow into a tray of a suitable size to produce a vitriform block upon cooling. The block was crushed with a hammer crusher to obtain about 750 kg of maltitol powder. The water content of the crushed powder was 0.05% based on dry weight loss (over $P_2O_5$ in a vacuum for 5 hours). The crushed powder was sifted through ASTM sieves (U.S. Standard Sieves) No. 12 and 30, to obtain particles having a diameter of 590 $\mu$ – 1680 $\mu$. A 2 kg amount of the maltitol particles was mixed with 2 kg of fine fructose particles having a diameter less than 250 $\mu$ (passed through ASTM No. 60 sieve) in a 10 liter horizontal cylindrical mixer equipped with a heater, and the mixture was heated to 65°C with mixing at a rotary speed of 30 r.p.m. The control of heating and temperature of the mixture were effected by the passage of hot or cool air and by heating the walls of the mixer. After heating to 65°C, the mixture was further mixed at that temperature for 60 minutes. The hot air was changed to cool air to cool the mixture to 30°C. The mixture was removed at 30°C and sifted through an ASTM No. 48 sieve to obtain 2.8 kg of the composite powder and 1.1 kg of fine fructose particles. The composite powder and an angle of repose of 40° and bulk density of 0.72 g/cm³. The coated fructose content was 45 parts to 100 parts of the core particles. The composite powder did not cake when kept at 37°C in a sealed container for more than 8 days and also did not cake when kept in an atmosphere having a relative humidity of 59% at 37°C for more than 1 hour. The uncoated maltitol powder was highly hygroscopic and caked readily so that the angle of repose could not be measured. The uncoated powder caked in 1 – 4 days when kept at 37°C in a sealed container. The uncoated powder also caked in several minutes when kept in an atmosphere having a relative humidity of 59% at 37°C.

Example 4

The process of Example 3 was repeated except that glucose, instead of fructose, was used to obtain 2.6 kg of the low caking composite powder. The composite powder had an angle of repose of 38° and bulk density of 0.72 g/cm³. The coated glucose content was 33 parts to 100 parts of the core particles. The composite powder did not cake when kept at 37°C in a sealed container for more than 8 days and also did not cake when kept in an atmosphere having a relative humidity of 59% at 37°C for more than 1 hour.

Example 5

The process of Example 3 was repeated except that sucrose, instead of fructose, was used to obtain 2.3 kg of a low caking composite powder. The composite powder had an angle of repose of 40° and a bulk density of 0.73 g/cm³. The coated sucrose content was 15 parts to 100 parts of the core particles. The composite powder did not cake when kept at 37°C in a sealed container for more than 8 days, and also did not cake when kept in an atomosphere having a relative humidity of 59% at 37°C for more than 4 hours.

Example 6

The process of Example 3 was repeated except that starch, instead of fructose, was used to obtain 2.7 kg of a low caking composite powder. The composite powder had an angle of repose of 39° and a bulk density of 0.74 g/cm³. The coated starch content was 37 parts to 100 parts of the core particles. The composite powder did not cake when kept at 37°C in a sealed container for more than 8 days, and also did not cake when kept in an atmosphere having a relative humidity of 59% at 37°C for more than 5 hours.

Example 7

A 100 kg amount of powdered wheat gluten having a diameter of less than 149 $\mu$, obtained by passage through an ASTM No. 100 sieve, was placed in a 1000 liter horizontal cylindrical mixer equipped with a heater. The mixer was rotated at 10 r.p.m. and the powder was heated to 75°C. A 100 kg portion of maltitol particles (particle diameter of 590 – 4000 $\mu$) was gradually added to the mixer with mixing. After heating to 75°C, the mixing was continued for 30 minutes at that temperature. The heating was carried out as set forth in Example 3. The hot air was changed to cool air to cool the mixture to 30°C. The mixture was removed and was sifted through an ASTM No. 48 sieve to obtain 147 kg of a low caking composite powder and about 50 kg of powdered wheat gluten. The composite powder had an angle of repose of 35° and a bulk density of 0.75 g/cm³. The wheat gluten content was 45 parts to 100 parts of the core particles. The composite powder did not cake when kept at 37°C in a sealed container and also did not cake in an atmosphere having a relative humidity of 59% at 37°C for more than 2 hours.

Example 8

Maltitol particles having a diameter of 590 – 1680 $\mu$ prepared by concentrating, caking, crushing and sifting an aqueous solution of maltitol (solid components composed of 95% maltitol and 5% other hydrogenated saccharides) in accordance with Example 3, were used. The process of Example 7 was repeated except that 100 g of said maltitol particles were mixed with 50 kg of lactose particles having a diameter less than 105 $\mu$ (passed through an ASTM No. 150 sieve) at 65°C for 60 minutes after reaching the temperature, to give 111 kg of low caking composite powder. The composite powder had an angle of repose of 38° and a bulk density of 0.74 g/cm³. The coated lactose content was 41 parts to 100 parts of the core particles. The composite powder did not cake at 37°C in a sealed container for more than 8 days and also did not cake in an atmosphere having a relative humidity of 59% at 37°C for more than 2 hours.

Example 9

A 100 g amount of the low caking composite powder having a diameter of 700 – 800 $\mu$ prepared as in Example 2, was placed in a small fludizing drier and was fluidized by passing air therethrough at 60° – 75°C and then steam at a pressure of 1 kg/cm² was injected for 3 – 5 seconds so that the fluidity was maintained, and the composite powder was further dried. The steam-dry operation was repeated 3 times and the mixture was cooled with cool air having no humidity to obtain 93 g of the composite powder. The composite powder had an angle of repose of 35° and a bulk density of 0.80 g/cm³. The composite powder did not cake when kept in an atmosphere having a relative humidity of 67.5% at 23.5°C for more than 3.5 hours.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A low caking composite maltitol powder, which comprises: core particles containing more than 50% by weight of maltitol and a coating of fine saccharide particles having a diameter less than ½ the diameter of the core particles.

2. The low caking composite maltitol powder of claim 1, wherein the saccharide is selected from the group consisting of monosaccharides, disaccharides, dextrin, starch and cellulose.

3. The low caking composite maltitol powder of claim 2, wherein the monosaccharide is glucose or fructose and the disaccharide is sucrose or lactose.

4. The low caking composite maltitol powder of claim 1, wherein the core particles have a diameter of 100 – 4000 $\mu$ and the fine saccharide particles have a diameter less than ½ that of the core particles, in the range of 20 – 350 $\mu$.

5. The low caking composite maltitol powder of claim 1, wherein the weight ratio of the fine saccharide particles to the core particles is 10 – 100: 100.

6. A process for preparing a low caking composite maltitol, which comprises: mixing 100 wt. parts of core particles containing more than 50% by weight of maltitol and having a diameter of 100 – 4000 $\mu$, with 10 – 200 wt. parts of fine saccharide particles with a diameter less than ½ that of the core particles, heating the mixture with stirring at a temperature of 40°–80°C to coat the fine saccharide particles onto the surface of the core particles, and cooling the product mixture.

7. The process of claim 6, wherein the saccharide is selected from the group consisting of monosaccharides, disaccharides, dextrin, starch and cellulose.

8. The process of claim 6, wherein excess fine saccharide particles which are not bonded onto the surface of the core particles are separated from the product mixture.

9. The process of claim 6, wherein water or steam is applied to the product mixture, and then the product is dried.

10. The process of claim 6, wherein water or steam is applied to a composite powder comprising the core particles coated with the fine saccharide particles, and then the product is dried.

11. The process of claim 6, wherein an aqueous solution containing maltitol is concentrated and cooled to form a block, the block is crushed and sifted to give core particles having a particle diameter of 100 – 4000 $\mu$, the saccharide having a particle diameter less than ½ that of the core particles and in the range of 20 – 350 $\mu$ is mixed with the core particles with stirring and heating at 40° – 80°C, and the product mixture is cooled and sifted to separate excess fine saccharide particles.

* * * * *